(12) United States Patent
Heider et al.

(10) Patent No.: US 12,326,189 B2
(45) Date of Patent: Jun. 10, 2025

(54) OIL SUPPLY SYSTEM FOR A MACHINE, IN PARTICULAR A POWER UNIT OF A MOTOR VEHICLE, AND POWER UNIT FOR A MOTOR VEHICLE WITH SUCH AN OIL SUPPLY SYSTEM

(71) Applicant: Valeo Powertrain GmbH, Ebern (DE)

(72) Inventors: Kevin Heider, Ebern (DE); Matthias Pfister, Ebern (DE); Michael Krause, Ebern (DE); Joachim Hoch, Ebern (DE); Roland Stoebel, Ebern (DE); Rolf Seidl, Ebern (DE); Vladimir Nickel, Ebern (DE); Katrin Ebert, Ebern (DE); Patrick Gegner, Ebern (DE)

(73) Assignee: Valeo Powertrain GmbH, Ebern (DE)

( * ) Notice: Subject to any disclaimer, the term of this patent is extended or adjusted under 35 U.S.C. 154(b) by 0 days.

(21) Appl. No.: 18/156,079

(22) Filed: Jan. 18, 2023

(65) Prior Publication Data

US 2023/0228323 A1 Jul. 20, 2023

(30) Foreign Application Priority Data

Jan. 19, 2022 (DE) ...................... 10 2022 101 185.2

(51) Int. Cl.
*F16H 57/04* (2010.01)

(52) U.S. Cl.
CPC ..... *F16H 57/0436* (2013.01); *F16H 57/0417* (2013.01); *F16H 57/0441* (2013.01); *F16H 57/0476* (2013.01)

(58) Field of Classification Search
CPC ............. F16H 57/0436; F16H 57/0417; F16H 57/0441; F16H 57/0476
See application file for complete search history.

(56) References Cited

U.S. PATENT DOCUMENTS 2,874,804 A 2/1959 Haas
10,816,085 B2 * 10/2020 Olson ................ F16H 57/0442
(Continued)

FOREIGN PATENT DOCUMENTS

DE 22 30 000 A1 1/1974
DE 23 44 949 A1 3/1975
(Continued)

OTHER PUBLICATIONS

Extended European Search Report issued on Jun. 7, 2023 in the corresponding European Application No. 22213360.5, 7 pages.
(Continued)

*Primary Examiner* — Michael A Riegelman
(74) *Attorney, Agent, or Firm* — Oblon, McClelland, Maier & Neustadt, L.L.P.

(57) ABSTRACT

An oil supply system for a machine, such as for a power unit of a motor vehicle, with a module body made of plastic including a collection tank which is divided into a prechamber and a main chamber. A predelivery pump can extract oil from the prechamber and pump it into the main chamber, a main delivery pump can extract oil from the main chamber and pump it to the machine, and a return line can return oil from the machine to the prechamber and/or the main chamber. A power unit for a motor vehicle can include such an oil supply system, wherein a predelivery suction opening is arranged on the floor of the prechamber and a main delivery suction opening is arranged on the floor of the main chamber, and the power unit is configured to be mounted in the motor vehicle with an orientation such that a line running through the two suction openings is arranged approximately parallel to the transverse axis of the vehicle.

27 Claims, 2 Drawing Sheets

(56) References Cited

U.S. PATENT DOCUMENTS

| | | | | |
|---|---|---|---|---|
| 11,719,239 | B2* | 8/2023 | Sperber | F16H 57/0441 |
| | | | | 60/484 |
| 2016/0363209 | A1* | 12/2016 | Lapp | B60K 17/105 |
| 2017/0219085 | A1* | 8/2017 | Kiyokami | F16H 57/0441 |
| 2018/0363762 | A1* | 12/2018 | Kiyokami | F16H 57/0441 |
| 2019/0219149 | A1* | 7/2019 | Olson | B64D 35/00 |
| 2022/0356941 | A1* | 11/2022 | Böhm | F16H 57/0453 |
| 2022/0389944 | A1* | 12/2022 | Hironaka | F16H 57/0441 |
| 2023/0228323 | A1* | 7/2023 | Heider | F01M 1/12 |
| | | | | 184/6.28 |

FOREIGN PATENT DOCUMENTS

| | | |
|---|---|---|
| DE | 10 2004 045441 A1 | 3/2006 |
| DE | 10 2008 018322 A1 | 10/2009 |
| DE | 10 2019 201 863 B3 | 6/2020 |
| GB | 705 683 A | 3/1954 |
| JP | 6-94805 B2 | 11/1994 |

OTHER PUBLICATIONS

German Search Report issued Jul. 20, 2022 in German Application 10 2022 101 185.2 filed on Jan. 19, 2022, 8 pages (with English Translation of Category of Cited Documents and Written Opinion).

* cited by examiner

OIL SUPPLY SYSTEM FOR A MACHINE, IN PARTICULAR A POWER UNIT OF A MOTOR VEHICLE, AND POWER UNIT FOR A MOTOR VEHICLE WITH SUCH AN OIL SUPPLY SYSTEM

The invention concerns an oil supply system for a machine, in particular for a power unit of a motor vehicle.

It is generally known that power units (drive motors, transmissions, clutches or combinations of these components) have an oil circuit which supplies oil to the bearing points and components requiring lubrication. In a simple example, a collection tank (oil sump) is provided from which oil is extracted by an oil pump and conveyed to the components to be lubricated or cooled. From there, the oil returns to the collection tank under the effect of gravity.

It is also known that in sporting vehicles which travel under high transverse acceleration for longer periods, additional measures are required to guarantee that sufficient oil can be delivered by the oil pump at all times, even on lengthy cornering. In this context, it is known to divide the collection tank into several part volumes and provide the oil pump with several suction pipes which extract oil from different locations in the oil tank, and/or to use flaps and valves to guarantee that under the effect of centrifugal force, the oil cannot flow out of the region from which it is extracted by the oil pump.

The object of the invention is to create an oil supply system with which oil can be reliably conveyed to the power unit even under high transverse acceleration over a lengthy period, without the need for valves, flaps or other moving components in the oil supply system.

To achieve this object, according to the invention an oil supply system is provided for a machine, in particular for a power unit of a motor vehicle, with a module body made of plastic comprising a collection tank which is divided into a prechamber and a main chamber, a predelivery pump which can extract oil from the prechamber and pump it into the main chamber, a main delivery pump which can extract oil from the main chamber and pump it to the machine, and a return line which can return oil from the machine to the prechamber and/or the main chamber. The invention is based on the fundamental idea of supplying the main chamber with the oil returned from the machine in two different ways: Part of the oil may reach the main chamber directly from the return line, and another part which reaches the prechamber is pumped into the main chamber by means of the predelivery pump. This guarantees that, under all operating conditions, a sufficiently high oil level is present there for the main delivery pump to be able to deliver the desired volume flow of oil to the machine.

The collection tank may be divided into the prechamber and main chamber by a partition wall, so that the two chambers can be created with low structural complexity and production cost.

The predelivery pump and the main delivery pump are mounted on the module body.

According to an embodiment of the invention, it is provided that the capacity of the main chamber is smaller than the capacity of the prechamber. As a result, the fill height of the main chamber is in principle comparatively high, so that the main delivery pump can extract oil under all operating conditions, According to an embodiment of the invention, a main delivery suction opening which is connected to the suction side of the main delivery pump is arranged substantially centrally on the floor of the main chamber. Because of the comparatively low volume of the main chamber, it is guaranteed that even under high transverse and longitudinal acceleration, the main delivery suction opening is covered with oil at all times.

Furthermore, a predelivery suction opening may be provided, which is connected to the suction side of the predelivery pump and arranged on an outside of the floor of the prechamber. The position of the predelivery suction opening is preferably selected such that it is covered with oil during such transverse acceleration, wherein a large part of the oil enters the prechamber and not the main chamber via the return line. The oil returned to the prechamber is then pumped by the predelivery pump into the main chamber, from where it can be delivered to the machine by the main delivery pump.

The predelivery pump and the main delivery pump may be configured as separate pumps which can be actuated as required with respect to the volume flow conveyed.

It is however preferred that the predelivery pump and main delivery pump are combined in one module or pump unit. According to one embodiment, it is possible for the predelivery pump and the main delivery pump to be integrated into a double-flow pump. For example, the rotor of the predelivery pump may be arranged on the same shaft as the rotor of the main delivery pump. According to the invention, the predelivery pump and the main delivery pump are driven by a common electric motor.

According to a preferred embodiment, it is provided that the predelivery pump and the main delivery pump are implemented by a rotary vane pump, in which the main delivery pump is formed by the pressure chambers defined between the adjacent rotary vanes, and the predelivery pump is formed by the pressure chambers defined between a rotor and the end face of the rotary vanes received in the rotor. Such a pump is very compact, so little space is required.

According to the invention, the module body further comprise a heat exchanger, a temperature sensor and a filter element mounted on the module body.

The invention also concerns a power unit for a motor vehicle with an oil supply system of the type described above, wherein a predelivery suction opening is arranged on the floor of the prechamber and a main delivery suction opening is arranged on the floor of the main chamber, and the power unit is configured to be mounted in the motor vehicle with an orientation such that a line running through the two suction openings is arranged approximately parallel to the transverse axis of the vehicle. With this orientation, there is a "right" chamber and a "left" chamber, one of which is a prechamber and the other a main chamber, and which, under high transverse acceleration of the vehicle, return the oil to the oil tank in different ways, as explained above.

The invention will be described below on the basis of an embodiment which is illustrated in the appended drawings. In the drawings.

Figure 1:
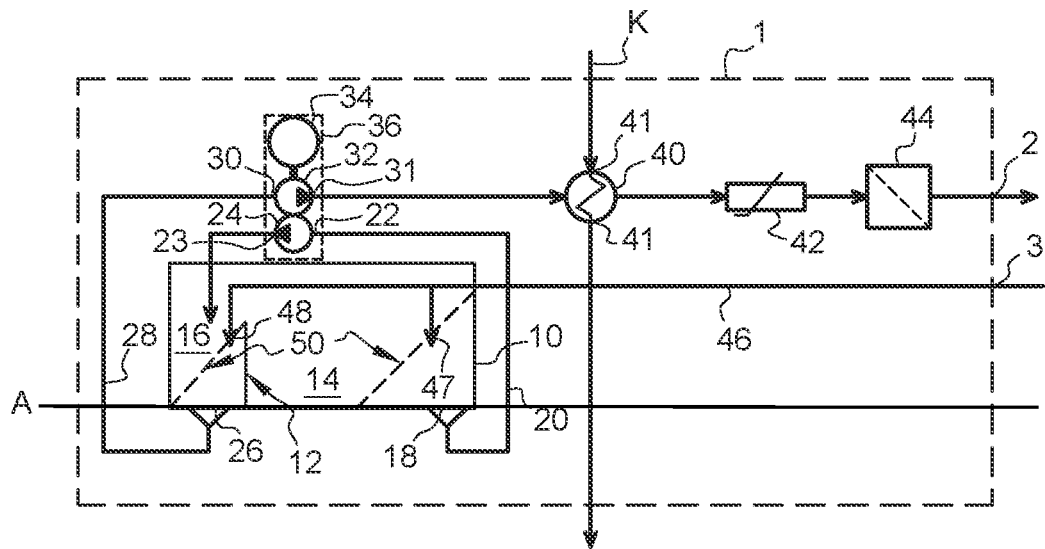
FIG. 1 shows schematically an oil supply system, wherein an oil level is marked which occurs under high transverse acceleration in a first direction.
Figure 2:
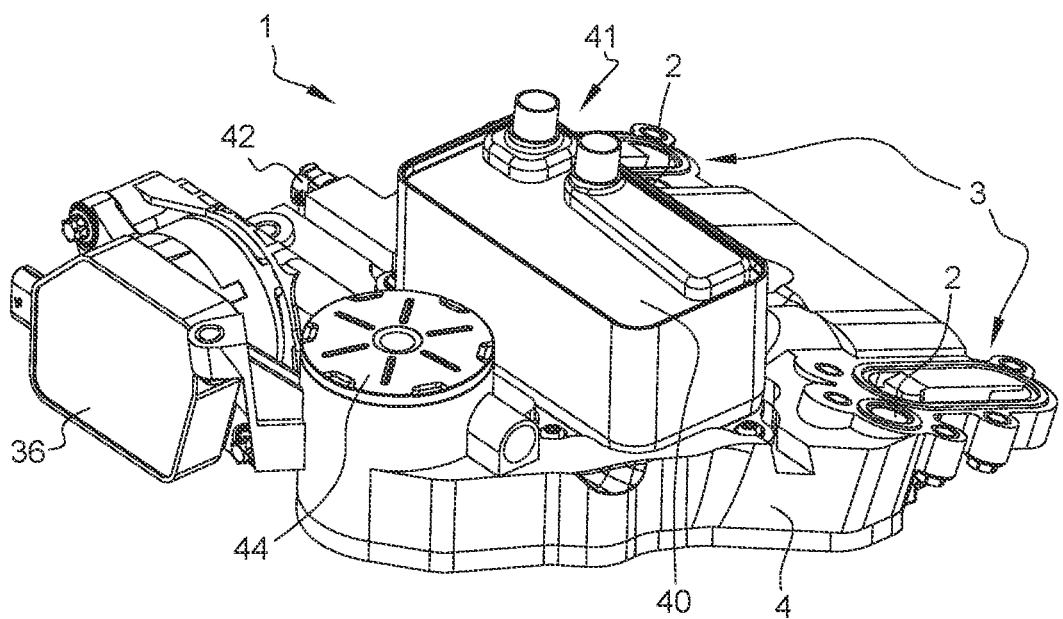
FIG. 2 shows the oil supply system from FIG. 1 in a perspective view.

FIGS. 1 and 2 show an oil supply system 1 which can supply a machine with oil. The oil may be used for lubrication and/or cooling. The machine may for example be a power unit for a motor vehicle which comprises for example an electric motor, a transmission and a clutch.

The power unit is not shown here as it is not relevant for understanding of the oil supply system. Only two interfaces 2, 3 between the oil supply system 1 and the machine it supplies are relevant here, namely a supply interface 2 at which oil is delivered from the oil supply system to the machine, and a return interface 3 via which the oil is returned from the machine to the oil supply system.

The oil supply system 1 has a module body 4 (see FIG. 2) which in the exemplary embodiment shown consists of plastic. The various components of the oil supply system 1 which will be explained below are integrated in the module body 4.

A collection tank 10, which may for example be configured in the manner of an oil sump, is formed inside the module body 4.

A partition wall 12 is arranged inside the collection tank 10 and divides the inner volume of the collection tank 10 into a prechamber 14 and a main chamber 16.

The partition wall 12 does not extend up to the upper boundary of the collection tank 10, so that under certain circumstances, oil can flow over the partition wall 12 from one chamber to the other.

A predelivery suction opening 18 is provided on the floor of the prechamber 14. and is connected via a suction line 20 to a suction side 22 of a predelivery pump 24. The predelivery pump 24 conveys oil extracted from the prechamber 14 into the main chamber 16.

A main delivery suction opening 26 is provided on the floor of the main chamber 16, and is connected via a suction line 28 to a suction side 30 of a main delivery pump 32.

As FIG. 1 shows, the volume of the main chamber 16 is smaller than the volume of the prechamber 14. In addition, the main delivery suction opening 26 is arranged approximately centrally on the floor of the main chamber 16. It is therefore guaranteed that, irrespective of the side on which the oil collects in the main chamber 16, the main delivery suction opening 26 is always reliably covered with oil.

The suction opening 18 however is not arranged centrally on the floor of the prechamber 14, but on the outside on the side facing away from the main chamber 16.

Furthermore, the two suction openings 18, 26 are arranged on opposite outer sides with respect to the collection tank 10 as a whole. Since the prechamber 14 has a larger volume than the main chamber 16, the prechamber suction opening 18 is arranged eccentrically on the outside of the floor of the prechamber 14, while the main delivery suction opening 26 is arranged centrally on the floor of the prechamber 16.

In principle, separate pumps may be used for the predelivery pump 24 and the main delivery pump 32. However, a double-flow pump is preferred, in particular of the type shown in FIG. 4. The rotary vane pump shown there is explained in more detail below. With reference to FIG. 2, the only relevant factor is that it is driven by an electric motor 34.

The electric motor 34, together with the predelivery pump 24 and the main delivery pump 32, forms a compact oil pump assembly 36.

As FIG. 2 shows, the oil pump assembly 36 is arranged on or integrated in the module body 4.

The main delivery pump 32 conveys the oil out of the main chamber 16 towards the supply interface 2 via pressure side 31 of the main delivery pump 32. Here, a heat exchanger 40, a temperature sensor 42 and a filter element 44 may also be provided within the oil supply system 1. By means of the heat exchanger 40 and a coolant stream K, which is indicated purely schematically here (see the supply and outlet designated jointly in FIG. 2 with reference sign 41), the temperature of the oil delivered to the machine can be controlled. The volume flow of the coolant may be controlled depending on a signal of the temperature sensor 42. The filter element 44 guarantees that no contaminants are supplied to the machine together with the oil.

The heat exchanger 40 has a housing of metal (in the exemplary embodiment shown, an aluminium alloy) and is arranged on the outside of the module body 4.

The filter element 44 is integrated in the module body 4.

The oil from the machine returns to the collection tank 10 via the return interface 3. A return line 46 provided for this purpose has two outlets 47, 48, namely an outlet 47 into the prechamber 14 and an outlet 48 into the main chamber 16.

The two outlets 47, 48 are here indicated schematically. They need not necessarily be provided on a single return line 46, but may form the end points of two completely separate return lines, for example one from a right side of the machine and one from a left side of the machine, back into the oil supply system 1.

Assuming that no significant acceleration forces (i.e. neither transverse acceleration from cornering nor longitudinal acceleration from acceleration or braking processes) act on the oil supply system 1, the oil returned via the return interface 3 is returned partly to the prechamber 14 and partly to the main chamber 16. The part reaching the prechamber 14 is pumped via the predelivery pump 24 into the main chamber 16, from where it is conducted to the supply interface 2 via the main delivery pump 32.

If the two suction openings 18, 26 are arranged along a line which corresponds substantially to the transverse axis A of the vehicle, and if we now assume that the vehicle in which the oil supply system 1 is installed is travelling around a corner such that the centrifugal forces are directed to the right relative to FIG. 2, an oil level as indicated with the dotted line 50 is obtained in the prechamber 14 and main chamber 16.

It can furthermore be assumed that, in the entire return circuit, the oil is rather pushed to the right in the same way as in the collection tank 10, that the oil largely reaches the collection tank 10 via the return opening 47, that is into the prechamber 14.

As the predelivery suction opening 18 is not arranged centrally on the floor of the prechamber 14 but on the right-hand side, it is ensured that oil can easily be extracted out of the prechamber 14 since it collects on the right-hand side of the prechamber 14 under the acceleration forces applicable here.

In this operating state, there are no negative effects if the majority of the oil enters the collection tank via the return opening 47 and not via the return opening 48, since the predelivery pump 24 guarantees that the oil nonetheless reaches the main chamber 16 from where it can be pumped to the supply interface 2 by the main delivery pump 32.

Figure 3:
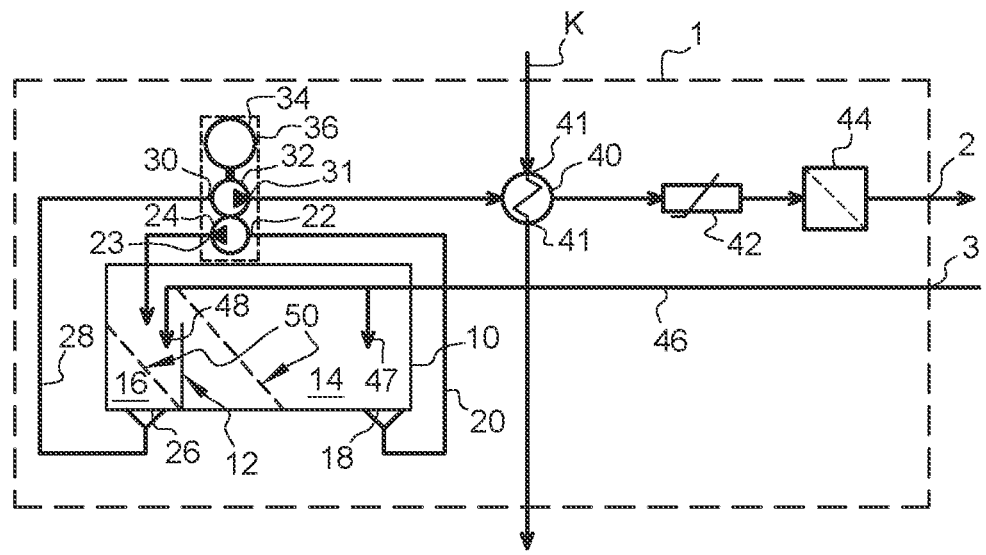
FIG. 3 shows schematically the oil supply system from FIG. 2, wherein an oil level is marked which occurs under high transverse acceleration in a second direction opposite the first direction.

FIG. 3 shows the oil supply system from FIG. 2 in an operating state in which the acceleration acts in the opposite direction to the acceleration assumed in FIG. 3. Accordingly, the oil collects on the left-hand side of the prechamber 14 and the main chamber 16.

It can be seen that part of the oil runs directly over the partition wall 12 and reaches the main chamber 16 in this way. Furthermore, a large part of the oil then flows directly into the main chamber 16 via the return opening 48. For this reason, there are no negative effects if the predelivery suction opening 18 is not covered with oil, and therefore the predelivery pump 24 does not pump oil into the main chamber 16. The oil reaches the main chamber 16 either via the return opening 48 or, if the fill level of the prechamber 14 is high enough, directly over the partition wall 12, and from there it is pumped to the supply interface 2 by the main delivery pump 32.

Figure 4:
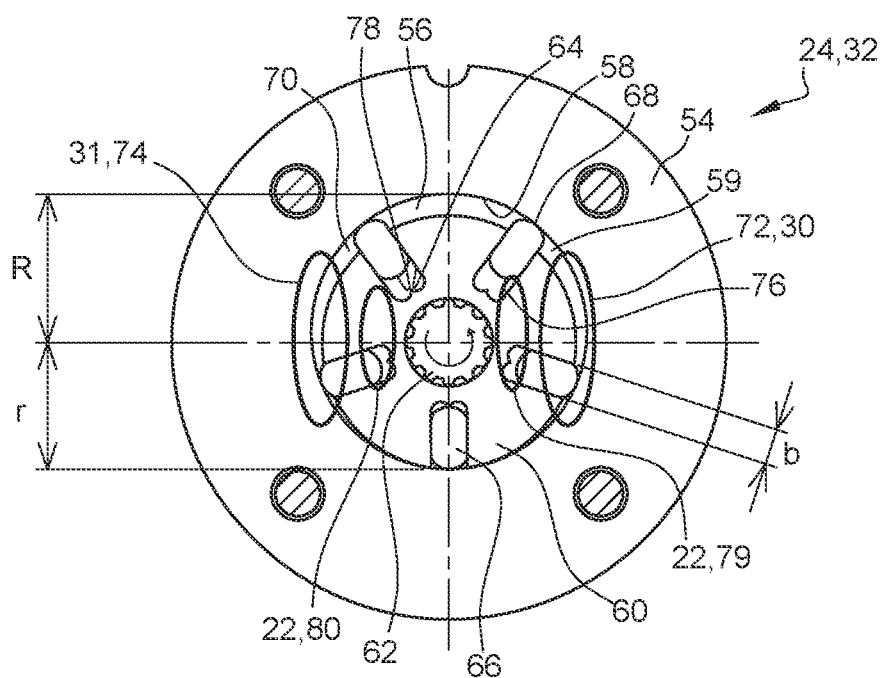
FIG. 4 shows in cross-section an exemplary dual pump with which both pumps shown in the oil supply system of FIGS. 2 and 3 can be implemented.

FIG. 4 shows schematically a dual pump with which the predelivery pump 24 and main delivery pump 32 are combined into a single pump.

This is a rotary vane pump or vane pump with a stator 54 in which an interior space 56 is formed which is surrounded by an inner wall 58.

A rotor 60 is arranged in the interior of the stator 54 and is mounted on a shaft 62 and can be driven by the latter.

The rotor 60 is provided with multiple receptacles 64, in which in each case one rotary vane 66 is received.

The receptacles 64 extend in the axial direction normally from a face side of the rotor 60 as far as the opposite face side, and from the outer periphery of the rotor inwards. In the exemplary embodiment shown, the receptacles 64 extend in the radial direction. This is not necessary, however.

Here, the rotary vanes are in the form of plates whose dimension in the radial direction is slightly less than the radial depth of the receptacles 64. Each of the plates has a thickness b, which corresponds to the width of the receptacles 64.

As an alternative to plate-like rotary vanes, use may also be made of rotary vanes which are in the form of a cylinder.

The rotor 60 has a diameter of 2×r (minus a clearance between rotor and stator that is to be provided in the design), which is less than the diameter r+R of the interior space 56 of the stator 54. The rotor 60 is arranged eccentrically in the interior space, specifically such that it is (almost) in contact with the inner wall 8 on one side (at the 6 o'clock position in this case). Accordingly, the maximum spacing to the outer wall of the rotor 60 is on the diametrically opposite side.

The rotary vanes 66 bear with their radially outer side 68 permanently against the inner wall 58 of the stator 54 (at any rate when the rotor 60 is rotating). Consequently, between rotary vanes 66 adjacent to one another in the peripheral direction, the inner wall 58 of the stator 54, the outer wall of the rotor 60 and two side walls which close off the interior space 56 at the face sides of the rotor 60 (and of which only the "rear" side wall 59 can be seen here), in each case one low-pressure chamber 70 is delimited. The function of the main delivery pump 32 is achieved with the pressure chambers.

In the exemplary embodiment shown, since five rotary vanes 66 are present, it is also the case that five pressure chambers 70 are formed. On a rotation of the rotor 60 through 360°, the volume of each individual pressure chamber changes from a minimum value (when the pressure chamber 70 is approximately at the 6 o'clock position) via a maximum value (when the pressure chamber 70 is approximately at the 12 o'clock position) and back to the minimum value.

The pressure chambers 70 are supplied with hydraulic fluid through the inlet 72 which is connected to the suction side 30. Said inlet 72, viewed in the direction of rotation of the rotor 60, is situated behind the point at which the spacing between the outer surface of the rotor 60 and the inner wall 58 of the stator 54 is minimal.

The hydraulic fluid drawn in by the pressure chambers 70 via the inlet 72 is discharged via a pressure outlet 74, which, viewed in the peripheral direction, is behind the position at which the pressure chambers 70 have the maximum volume, but in front of the position at which the spacing between the outer side of the rotor 60 and the inner wall 58 of the stator 54 is minimal. The pressure outlet 74 then leads to the supply interface 2.

The inlet 72 and the pressure outlet 74 are arranged here in one of the side walls 59 of the hydraulic pump or also, so as to improve the filling, in both side walls 59, so that the hydraulic fluid can be drawn into or expelled from the pressure chamber 70 on both sides.

Each of the rotary vanes 66, together with the rotor 60 (and also the side walls 59), delimits a respective predelivery pump pressure chamber 76. Specifically, each radially inner side 78 of each rotary vane 66, together with the walls of the receptacle 64 and the side walls 59 shown, delimits a respective predelivery pump pressure chamber 76.

The volume of the predelivery pump pressure chambers 76 changes according to the displacement of the rotary vanes 66 in the receptacles 64. When the rotary vanes 66 move outwards (i.e. during a movement from the 6 o'clock position to the 12 o'clock position via the 3 o'clock position in the exemplary embodiment shown), the volume of the predelivery pump pressure chambers 76 increases, and when the rotary vanes 66 move inwards (i.e. during a movement from the 12 o'clock position to the 6 o'clock position via the 9 o'clock position), the volume decreases.

In this way, a piston pump is formed in which the radially inner side 78 of each rotary vane 66 may be regarded as the end face of a pump piston which is moved by means of a curved path (of the inner wall 58 of the stator 54). For suction, the pump piston is moved outwards under the action of centrifugal force, and for expulsion, the pump piston is displaced inwards owing to the contour of the inner wall 58 of the stator 54.

The predelivery pump pressure chamber 76 draws in oil via a pre-pump pressure inlet 79 which is connected to the suction side 22.

A predelivery pump pressure outlet 80 which is separate from the pressure outlet 74 is provided on the pressure side 23 of the predelivery pump 24. In the peripheral direction, said pressure outlet is arranged approximately at the same position as the pressure outlet 74 and leads into the main chamber 16.

The dual pump shown in FIG. 4 is an example of a pump assembly which may be used. In principle however, any type of double-flow pump may be used for the oil supply system. For example, gear pumps with two rotors may be used, for example gerotor pumps.

The invention claimed is:

1. An oil supply system for a machine, in particular for a power unit of a motor vehicle, with a module body made of plastic comprising:
   a collection tank which is divided into a prechamber and a main chamber,
   a predelivery pump configured to extract oil from the prechamber and pump it into the main chamber,
   a main delivery pump configured to extract oil from the main chamber and pump it to the machine,
   a supply interface via which the oil is delivered to the machine,
   a plurality of return interfaces via which the oil is returned from the machine to the collection tank via at least one return line,
   wherein the predelivery pump and the main delivery pump are driven by a common electric motor forming an oil pump assembly, wherein the oil pump assembly is arranged on or integrated in the module body,
wherein a predelivery suction opening is provided in the prechamber and is connected via a suction line to a suction side of the predelivery pump,
wherein a main delivery suction opening is provided in the main chamber and is connected via a suction line to a suction side of the main delivery pump, and
wherein the suction lines are integrated in the module body.

2. The oil supply system according to claim 1, wherein in the collection tank, a partition wall is provided which divides the collection tank into the prechamber and the main chamber.

3. The oil supply system according to claim 2, wherein the capacity of the main chamber is smaller than the capacity of the prechamber.

4. The oil supply system according to claim 2, wherein the predelivery pump and the main delivery pump are integrated in a double-flow pump.

5. The oil supply system according to claim 2, wherein the predelivery pump and the main delivery pump are driven by a common electric motor.

6. The oil supply system according to claim 2, wherein the predelivery pump and the main delivery pump are implemented by a rotary vane pump, in which the main delivery pump is formed by the pressure chambers defined between the adjacent rotary vanes, and the predelivery pump is formed by the pressure chambers defined between a rotor and the end face of the rotary vanes received in the rotor.

7. The oil supply system according to claim 2, wherein the module body further comprise a heat exchanger, a temperature sensor and a filter element mounted on the module body.

8. A power unit for a motor vehicle, with the oil supply system according to claim 2, wherein a predelivery suction opening is arranged on the floor of the prechamber and a main delivery suction opening is arranged on the floor of the main chamber, and the power unit is configured to be mounted in the motor vehicle with an orientation such that a line running through the two suction openings is arranged parallel to a transverse axis of the vehicle.

9. The oil supply system according to claim 1, wherein the capacity of the main chamber is smaller than the capacity of the prechamber.

10. The oil supply system according to claim 9, wherein the predelivery pump and the main delivery pump are integrated in a double-flow pump.

11. The oil supply system according to claim 9, wherein the predelivery pump and the main delivery pump are driven by a common electric motor.

12. The oil supply system according to claim 9, wherein the predelivery pump and the main delivery pump are implemented by a rotary vane pump, in which the main delivery pump is formed by the pressure chambers defined between the adjacent rotary vanes, and the predelivery pump is formed by the pressure chambers defined between a rotor and the end face of the rotary vanes received in the rotor.

13. The oil supply system according to claim 1, wherein the main delivery suction opening, which is connected to the suction side of the main delivery pump, is arranged substantially centrally on the floor of the main chamber.

14. The oil supply system according to claim 1, wherein the predelivery suction opening, which is connected to the suction side of the predelivery pump, is arranged on an outside of the floor of the prechamber.

15. The oil supply system according to claim 1, wherein the predelivery pump and the main delivery pump are integrated in a double-flow pump.

16. The oil supply system according to claim 1, wherein the predelivery pump and the main delivery pump are driven by a common electric motor.

17. The oil supply system according to claim 1, wherein the predelivery pump and the main delivery pump are implemented by a rotary vane pump, in which the main delivery pump is formed by the pressure chambers defined between the adjacent rotary vanes, and the predelivery pump is formed by the pressure chambers defined between a rotor and the end face of the rotary vanes received in the rotor.

18. The oil supply system according to claim 1, wherein the module body further comprise a heat exchanger, a temperature sensor and a filter element mounted on the module body.

19. A power unit for a motor vehicle, with the oil supply system according to claim 1, wherein a predelivery suction opening is arranged on the floor of the prechamber and a main delivery suction opening is arranged on the floor of the main chamber, and the power unit is configured to be mounted in the motor vehicle with an orientation such that a line running through the two suction openings is arranged parallel to a transverse axis of the vehicle.

20. The oil supply system according to claim 1, wherein a predelivery suction opening, which is connected to the suction side of the predelivery pump, is arranged on an outside of the floor of the prechamber.

21. The oil supply system according to claim 1, wherein there are a plurality of supply interfaces.

22. The oil supply system according to claim 21, wherein there are two supply interfaces.

23. The oil supply system according to claim 1, wherein there are two return interfaces.

24. The oil supply system according to claim 1, wherein a predelivery suction opening is provided in the prechamber and is connected via a suction line to a suction side of the predelivery pump, the suction line is integrated in the module body.

25. The oil supply system according to claim 1, wherein a main delivery suction opening is provided in the main chamber and is connected via a suction line to a suction side of the main delivery pump, the suction line is integrated in the module body.

26. The oil supply system according to claim 1, wherein the at least one return line has two outlets, namely an outlet into the prechamber and an outlet into the main chamber.

27. The oil supply system according to claim 1, wherein the at least one return line includes two return lines.

* * * * *